United States Patent [19]

Brueckner

[11] 4,247,062

[45] Jan. 27, 1981

[54] HIGH EFFICIENCY VERTICAL TAIL ASSEMBLY COMBINED WITH A VARIABLE WING GEOMETRY

[75] Inventor: Hartmut Brueckner, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 964,126

[22] Filed: Nov. 27, 1978

[30] Foreign Application Priority Data

Dec. 16, 1977 [DE] Fed. Rep. of Germany ....... 2756107

[51] Int. Cl.$^3$ ............................ B64C 5/06; B64C 5/10
[52] U.S. Cl. ........................................ 244/91; 244/36; 244/87
[58] Field of Search ....................... 244/87, 91, 46, 49, 244/88, 36, 218, 47

[56] References Cited

U.S. PATENT DOCUMENTS 3,104,079  9/1963  Phillips ............................ 244/218 X

FOREIGN PATENT DOCUMENTS 934286  8/1963  United Kingdom ...................... 244/47

Primary Examiner—Barry L. Kelmachter
Attorney, Agent, or Firm—W. G. Fasse; D. F. Gould

[57] ABSTRACT

A high efficiency vertical tail unit is combined with a variable wing geometry for large angles of attack, primarily for all-wing aircraft such as delta-type craft. The vertical tail unit is hinged for adjustment about an axis substantially parallel to the longitudinal axis of the fuselage. The outer wing portions are connected, at an angle, with a vertical tail unit which is directed vertically downward in its normal position. The assembly comprising an outer wing portion and a vertical tail unit is rotatable about the parallel axis whereby three different wing types may be realized in the same craft.

3 Claims, 4 Drawing Figures

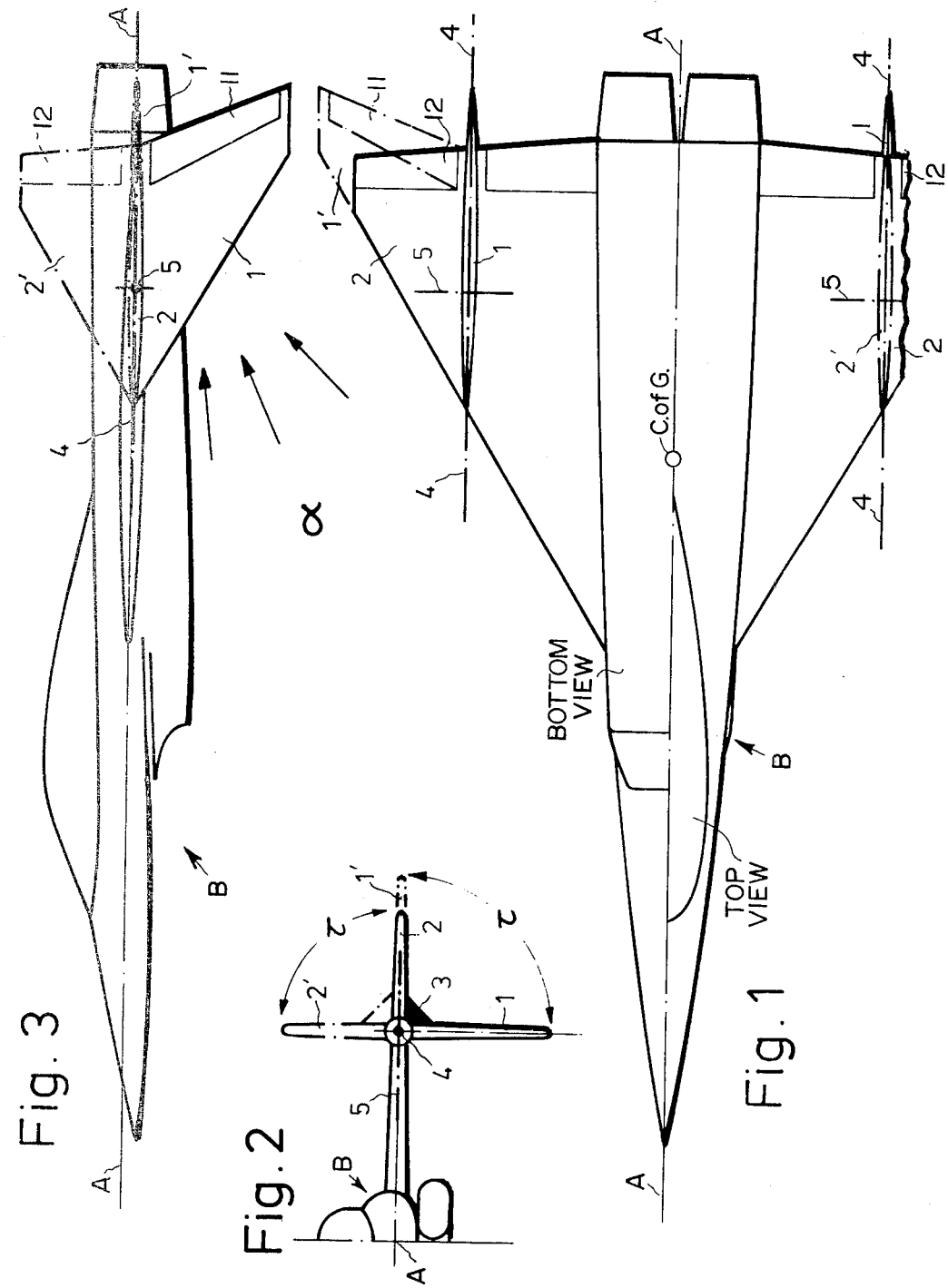

HIGH EFFICIENCY VERTICAL TAIL ASSEMBLY COMBINED WITH A VARIABLE WING GEOMETRY

BACKGROUND OF THE INVENTION

The invention relates to a high efficiency vertical tail assembly combined with a variable wing geometry for large pitch angles, mainly for all-wing aircraft, particularly for delta-type aircraft, wherein the vertical tail is tiltable about an axis in the wing plane, which axis extends in parallel to the longitudinal axis of the fuselage. Such a configuration is known from the German Patent Publication (DOS) No. 2,348,201. The vertical tail described and illustrated in said prior publication has a variable geometry, wherein rectangularly shaped vertical tail portions may be tilted or hinged about axes parallel to the longitudinal axis of the fuselage.

U.S. Pat. No. 3,104,079 discloses a space glider which is lifted off the ground by means of a rocket, preferably for carrying supplies to satellites. After completion of its mission the space glider returns to the base of departure. Such a flying body is constructed as an all-wing flying body, which comprises tail unit members located at the rear ends of the lifting surface on both sides of the fuselage. These tail unit members are tiltable about horizontal axes. The tail unit members are folded in or retracted during the so-called "piggy-back" flight; during self-sustained flight the tail unit members must be extended. The overhead tail unit members and the lateral vertical tail means, particularly at large angles of attack, are still situated substantially in the shadow of the wing, especially since an additional surface which lengthens the wing tip, is extended at the same time, whereby one half of the vertical tail unit or assembly surfaces becomes nearly ineffective. However, when such aircrafts are used as "gliders", these angle of attack problems occur only to a limited extent. The German Patent Publication (DAS) No. 1,056,482 describes a tail unit assembly wherein the flappable or hingeable wing surface portions are hingeable downwrdly into a vertical plane. Tilting of such vertical tail arrangements at the wing tips through an angle of about 45° is also known already. However, such configurations also do not allow extremely large angles of attack within the so-called post-stall range.

Conventional vertical tail assemblies are usually rigidly attached to the back of the fuselage tail. However, such an arrangement results in severe disadvantages when flying with high angles of attack. For example, the vertical tail unit is shadowed by the fuselage and partially by the wing and the elevator assembly. As a result, such a vertical tail unit gets more and more into the wake field of the wing, fuselage, and elevator assembly whereby the local incident flow conditions of the vertical tail assembly become increasingly worse, for example, due to a lessened dynamic pressure, whereby the effectiveness is reduced and the effective side slip angle at the vertical tail unit becomes smaller than the geometric side slip angle. Furthermore, the effective sweep-back of the fin and of the vertical tail increases, and the profile of the vertical tail unit becomes increasingly disadvantageous because the profile structure extending perpendicularly to the leading edge gradually becomes a lateral edge.

The above shows that the contributions of an overhead vertical tail unit to the stability of the craft during side slip flight at high angles of attack become increasingly less effective. The effectiveness of the vertical tail is also simultaneously lost. Such loss may be avoided, when low positioned vertical tail units are used. Until recently, however, such low positioned vertical tail units could not be constructed with the desired dimensions, that is, they could not be constructed with a sufficient aspect ratio and area size.

OBJECTS OF THE INVENTION

In view of the above it is the aim of the invention to achieve the following objects singly or in combination:

to provide a vertical tail unit particularly for an all-wing aircraft of the type mentioned above which vertical tail unit may be efficiently used at high angles of attack and even at extremely high angles of attack;

to arrange the vertical tail unit in such a manner that it may be dimensioned adequately for the intended purpose;

to construct the wings and the vertical tail assembly in such a manner that the vertical tail assembly is not in the shadow of any other aircraft component whereby the incident flow is used in an optimal manner;

to construct the wing and vertical tail assembly so that the configuration of the wing geometry may be adapted to the instantaneous type of flight, for example, to convert delta wings to tapered wings and vice versa;

to rigidly locate the vertical tail assembly at an angle relative to the wing surface, said angle having an origin on an axis extending substantially in parallel to the longitudinal axis of the aircraft; and to rotate the wing tip with the vertical tail selectively about an axis extending in parallel and/or about an axis extending perpendicularly to the longitudinal axis of the aircraft.

SUMMARY OF THE INVENTION

According to the invention there is provided a high efficiency vertical tail assembly combined with a variable wing geometry for large angles of attack, wherein the vertical tail assembly may be hinged or tilted about an axis extending substantially in parallel to the longitudinal axis of the craft, wherein the outer wing portions or tips are connected to the vertical tail assembly at an angle ($\tau$) which is about 90° in the basic, downwardly pointing position of the vertical tail assembly, and wherein the rudder assembly and the wing tip form a unit which is tiltable about said axis extending substantially in parallel to the longitudinal axis of the craft.

In contrast to prior art low positioned, rigid vertical tail units the vertical tail unit of the present invention may be dimensioned with any desired and hence sufficient size and shape. Due to the position of the present vertical tail unit below the wing the vertical tail unit is free of any shadowing by other portions of the aircraft in all instances of positive angles of attack. Hence, the incident flow is freely effective and the flow conditions at the rudder unit are greatly enhanced. This arrangement has the additional advantage that the contribution to the stability of the craft and the rudder effectiveness is increased by the directivity effect and by the end plate effect of the wing, particularly at large angles of attack. The efficiency of the arrangement is increased still further because the sweep-back angle of the vertical tail unit is reduced with an increasing pitch angle of the wing, whereby the Mach number necessarily decreases.

Due to the above features the invention assures sufficient yaw moments and directional stability even for extreme angles of attack. By hinging the components defined in claim 1 upwardly about the given axes it becomes possible to change the wing geometry and hence to adapt it to the flight condition. This possibility is enhanced by a varied geometrical configuration of the vertical tail units and of the outer wing portions. The parameters that may be varied are: wing area, wing aspect ratio wing tapering, wing sweep back, and the position of the neutral point of the wing.

Within the scope of the invention, it may be of advantage, if the assemblies comprising the vertical tail unit and the outer wing portion are arrestable or lockable in any position within the flapping or hinging range. Such inbetween positions may result in advantages with reference to possibly intended direct side force control and direct lift control and with regard to the induced wing drag.

A further advantage relating to the longitudinal stability and to the longitudinal trim capability, particularly in connection with all-wing aircraft, is seen in that the entire units may additionally be rotatable about an axis lying in the plane of the wings and perpendicularly to the longitudinal axis of the fuselage and arrestable in such a rotated position.

BRIEF FIGURE DESCRIPTION

In order that the invention may be understood, it will now be described, by way of example, with reference to the accompanying drawings, wherein:

FIG. 1 illustrates a schematic top and bottom view of an all-wing aircraft with various positions of the rudder unit;

FIG. 2 shows a partial front view of the craft according to FIG. 1 in the direction of the longitudinal axis of the craft;

FIG. 3 shows a side view of the craft of FIG. 1; and shows power hinges for use in the present invention.

Figure 4:
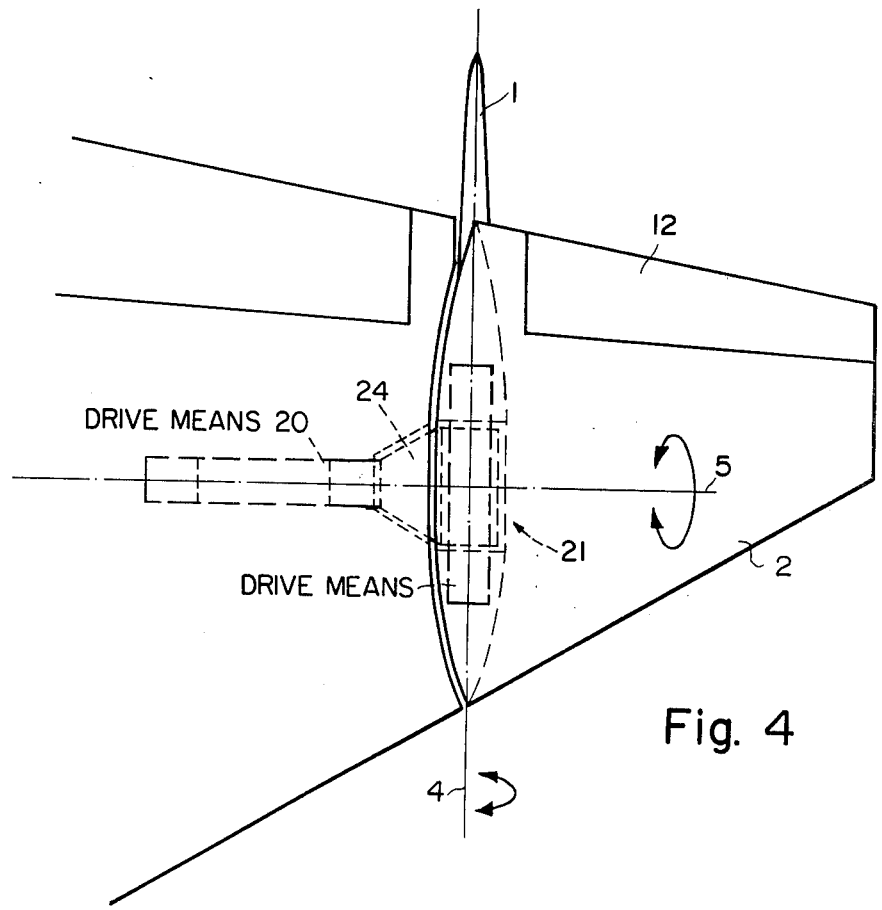

DETAILED DESCRIPTION OF PREFERRED EXAMPLE EMBODIMENTS ILLUSTRATING THE BEST MODES OF THE PRESENT INVENTION

Referring to FIGS. 1, 2, 3 and 4, the wing members 2 and the respective vertical tail units 1 of the example embodiment are rigidly connected to each other to form an assembly 3 which is hingeable about a horizontal hinging axis 4 extending in parallel to the longitudinal axis A of the craft B. There are basically three aircraft configurations possible by the just described structure and such configurations may even be adjusted during flight.

First, a delta wing craft, such as an aircraft, may be realized as best seen in FIG. 1, with two vertical tail units 1 directed downwardly for use particularly for supersonic flight and in the post stall range. The vertical tail units may take up a horizontal position as shown in dash-dotted lines at 1'. When the vertical tail units 1 are in the position 1' the respective wing portions 2 are in the position 2'. This feature has the advantage that starting and landing is facilitated because now the wing portion 2 in its upwardly pointing position 2' after tilting through an angle of 90°, may act as a vertical tail unit while the actual vertical tail unit 1 in its position 1' may act as an extended wing tip.

Second, an all-wing tapered wing type craft may be realized during flight with an adjustment as described above wherein the original wing tips 2 take up position 2' to act as overhead vertical tail units while the original rudder units become wing tips.

A third configuration results by a hinging adjustment of the vertical tail arrangement about 45° or to any desired angle between 0° and 90°. In this embodiment the wing members 2 and the vertical tail unit 1 also assume a rigid V-position relative to each other to form the unit 3.

The flap adjustment or hinging in all of the configurations described above with reference to FIGS. 1, 2 and 3 is accomplished primarily with the aid of the rudders or flaps 11, 12 forming part of the combination of the wing tip and vertical tail unit, and by drive means integrally installed in interference reducing displacement bodies located about the hinging axis 4.

This example embodiment has the additional advantage, that by means of the proposed features, a transformation from a delta wing craft into a tapered wing craft is possible and vice versa during flight whereby the wing configuration may be adapted to the flight condition.

In order to improve the longitudinal stability and the longitudinal trim capability of delta wing craft, the wing tip-vertical tail unit combination of the invention is additionally rotatable about an axis 5 perpendicular to the longitudinal axis A of the craft or aircraft B. Such rotation of the vertical tail unit 1, 2 about the axis 5 may be done by any suitable conventional drive means. The vertical tail unit is thus rotated in the direction of incident flow whereby at extremely high angles of attack α, namely, angles of attack larger than the sweep-back angle of the rudder unit, an even further improved directional stability and effectiveness of vertical tail may be attained.

According to the present invention, a high efficiency vertical tail unit for all angles of attack is obtained which is free of shadowing and which is situated in the incident flow path. In addition, an adaptation to the instantaneous flight condition is accomplished by the variability of the geometry of the wing contour.

For a delta winged craft with low positioned vertical tail units a better transonic and supersonic efficiency is obtained and hence it is possible to fly such craft in the extreme post stall range.

For a tapered wing craft, the present configuration has the advantage of better subsonic efficiency, particularly at low angles of attack and during starting and landing.

When the wing tip 2 is in the plane of the wing the rotational axis 4 and the rotational axis 5 are in the same plane. Rotation about the axis 4 may be accomplished by keeping the axis 5 stationary. In addition, a further rotation about the axis 5 may be superimposed on the first mentioned rotation or the axis 4 may be kept stationary, e.g., not rotated about itself, during flight and control movements about the axis 5.

FIG. 4 shows a first conventional drive means 20 having a rotational axis which coincides with the rotational axis 5 for rotating the wing tip 2 and vertical tail 1 about the axis 5. A second conventional drive means 21 has a rotational axis coinciding with the rotational axis 4 for rotating the wing tip 2 and vertical tail 1 about the axis 4. A pivotal connection 24 is provided between the drive means 20 and 21.

Although the invention has been described with reference to specific example embodiments, it is to be understood that it is intended to cover all modifications and equivalents within the scope of the appended claims.

What is claimed is:

1. A high efficiency vertical tail assembly for an all-wing craft having a longitudinal axis and comprising a fuselage and two wings, said wings defining a common plane extending laterally away from said fuselage, each wing having a respective wing tip, said vertical tail assembly consisting of two identical vertical tail units, one vertical tail unit being provided for each of said wing tips, each vertical tail unit consisting of its wing tip (2) and of a vertical tail surface (1) rigidly connected to the wing tip so as to include a given angle ($\tau$) between the wing tip and the vertical tail surface, whereby in the normal position the wing tip extends in said common plane and the vertical tail surface extends downwardly from said common plane, and pivotal connecting means operatively connecting each vertical tail unit to its wing, said pivotal connecting means having an axis extending substantially in parallel to said longitudinal axis of the craft, whereby each vertical tail unit may be tilted out of said normal position so that the wing tip extends upwardly from said common plane and the vertical tail surface extends in said common plane to form the wing tip.

2. The assembly of claim 1, wherein said given angle ($\tau$) is substantially 90°.

3. The assembly of claim 1, further comprising drive means arranged in each wing and operatively connected to its respective vertical tail unit consisting of the wing tip (2), the vertical tail surface (1) and the respective pivotal connecting means, for rotating the respective vertical tail unit about an axis (5) extending in the wing substantially at a right angle to the longitudinal axis of the craft.

* * * * *